United States Patent [19]
Reese et al.

[11] Patent Number: 6,119,995
[45] Date of Patent: Sep. 19, 2000

[54] ROTATIONAL MOUNT FOR DISPLAY UNIT

[75] Inventors: Kenneth C. Reese; Silverio Pacifico, both of Orlando, Fla.

[73] Assignee: Lockheed Martin Corporation, Orlando, Fla.

[21] Appl. No.: 09/334,869

[22] Filed: Jun. 17, 1999

[51] Int. Cl.[7] .................................................. A47F 5/00
[52] U.S. Cl. ................................................. 248/288.51
[58] Field of Search ........................ 248/288.51, 288.31, 248/274.1, 276.1, 278.1, 177.1; 403/90

[56] References Cited

U.S. PATENT DOCUMENTS

| 3,900,180 | 8/1975 | McPhee | 248/288.31 |
| 4,423,850 | 1/1984 | Bass | 248/288.51 X |
| 5,118,058 | 6/1992 | Ritcher | 248/278.1 X |
| 5,135,196 | 8/1992 | Schehr | 248/287.1 X |

*Primary Examiner*—Ramon O. Ramirez
*Attorney, Agent, or Firm*—Rockey, Milnamow & Katz, Ltd.

[57] ABSTRACT

A force multiplying single point mount capable of reliably resisting relatively high displacement torques when locked incorporates a steel ball within a rotatable and tiltable housing. The housing can be clamped to the ball, which is fixedly supported relative to a selected surface, by means of first and second plates axially displaced from one another at opposite ends of the ball. A single locking lever can be used to release the ball from the housing to enable the housing to tilt and rotate to a selected position. The housing can then be locked to the ball by clamping one of the plates against the ball. The plate is movable on one end by rotating the locking lever in a threaded bore. It pivots at a second end. The ball is positioned between the two ends. The over all mechanical advantage is such that when locked, loads exerting on the order of 200 foot-pounds of torque can be supported without slippage or change of position.

57 Claims, 3 Drawing Sheets

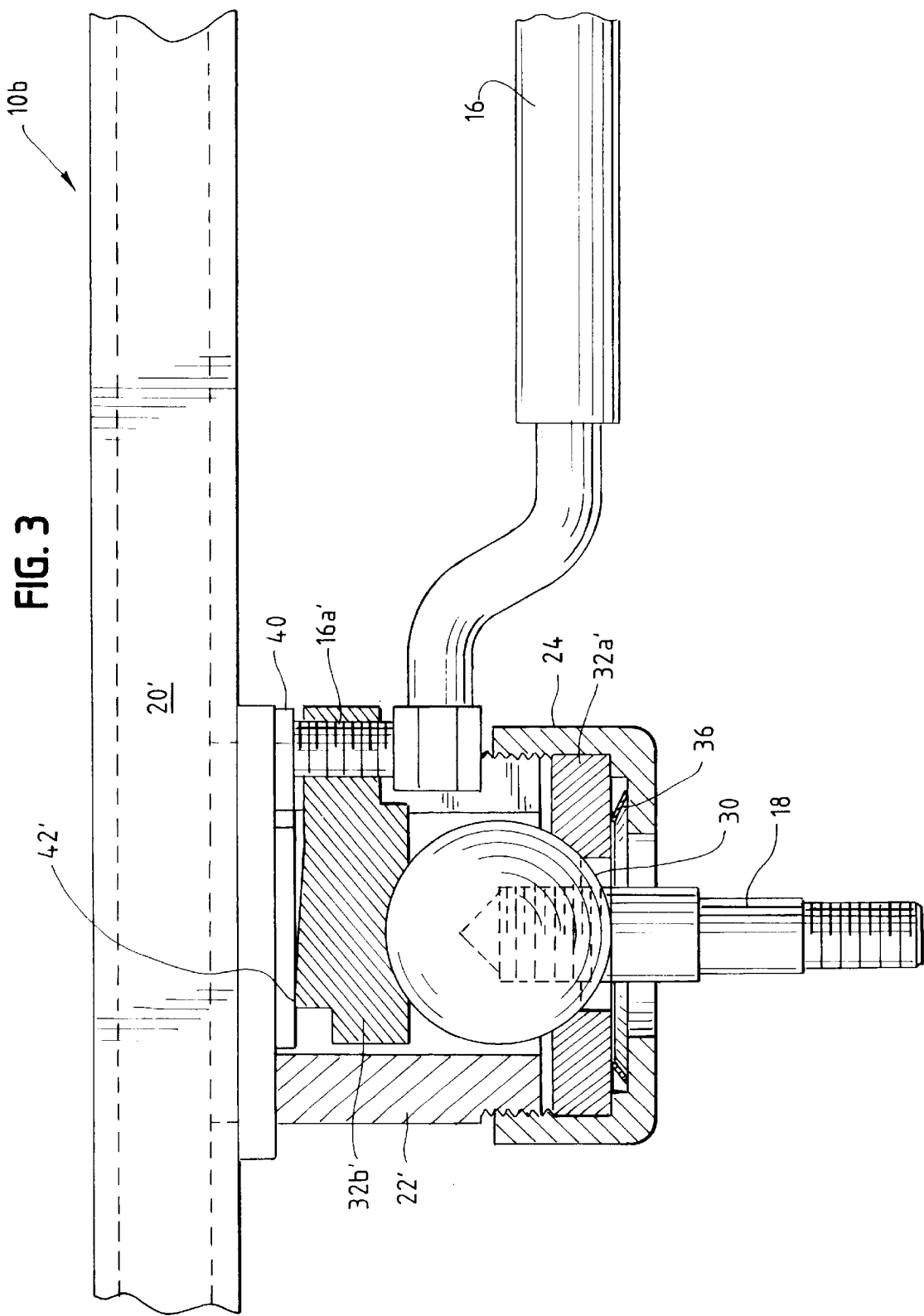

ROTATIONAL MOUNT FOR DISPLAY UNIT

FIELD OF THE INVENTION

The invention pertains to mounts for supporting display devices wherein the mount can be both tilted and rotated. More particularly, the invention pertains to such mounts which are intended to withstand shock and vibration, for example which might be found in a moving vehicle, while still permitting the display to be tilted and rotated.

BACKGROUND OF THE INVENTION

Display devices, such as might be used with computers or control equipment, are available in a variety of shapes and sizes. Display devices using a cathode ray tube typically have a slightly curved exterior surface. Other display devices, such as plasma or liquid crystal displays, exhibit planar front viewing surfaces.

The angle with which a user views the display surface is important. Preferably, the user will have a line of sight which is substantially perpendicular to the display's surface. This orientation minimizes both operator fatigue and likelihood of misreading the information on the display surface.

It may not always be possible to completely align the display surface for optimal viewing. However, it is desirable to be able to, over a predetermined range, adjust the display surface to enable the user to obtain the most optimal view of the display surface.

Beyond a need to be able to rotate or tilt the display so as to adjust the display surface relative to the user's line of sight, other environmental considerations need to be addressed. For example, if the display is mounted in a moving vehicle, the mechanical configuration of the display mount preferably will be such that it will not shift from an initial position due to vibration or shock as the vehicle is moving.

Also preferably, the user will be able to adjust the orientation of the mount, and the display surface using a simple, single handed adjustment control for both the tilt and rotation. Further, it would be preferable if the adjustment mechanism of the mount was relatively small relative to the size of the load which can be supported at a predetermined position, without slippage or movement. Finally, from both a reliability and a manufacturing point of view, it would be desirable if the structure of the mount was relatively simple without complex, potentially fragile, parts.

SUMMARY OF THE INVENTION

An adjustable mount having a limited number of robust parts exhibits a substantial mechanical advantage in the production of a clamping force. The clamping force, in turn, produces a substantial torque so as to be able to stably support loads which produce on the order of 200 foot-pounds of torque.

The mount incorporates a steel ball which is sandwiched between first and second plates. The ball and the first and second plates are contained within a housing. A spring in the housing preloads the ball.

The housing, in a preferred embodiment, is formed of first and second portions which are rotatably coupled together by threads. Other rotatably based coupling arrangements, for instance a twist lock arrangement, could also be used. The two portions of the housing are coupled together to produce a predetermined preload torque.

The housing is formed with an opening at one end. A shaft, embedded in the ball, extends from the opening and can be fixed to a mounting bracket and attached, for example to a table or desk. A surface is provided at the other end of the housing which can be tilted and rotated. A display or other object can be placed on the surface as desired.

A single locking lever is available for adjusting both the tilt and the rotation of the mount. The lever is rotatably attached to one of the plates, preferably by threads. An extension of the lever bears against a portion of the housing in response to the lever being rotated. This creates a first type of mechanical advantage.

When the lever is rotated into an adjusting position, only the preload force is present. The housing can be either tilted or rotated relative to the position of the ball. The exact degree of tilt or rotation can be adjusted using the lever.

When a desired position of the housing has been achieved, the mount can be locked into that position by rotating the lever into a locking position. In the locking position, due to the threads, the extension of the lever bears against the portion of the housing. The first mechanical advantage results from the threaded coupling between the lever and the threaded plate.

The process of rotating the extension of the lever against the housing forces one end of the plate to move toward the ball increasing frictional forces between the plate and the region of the ball. The other end of the plate is pivoted against a pivot portion of the housing. The pivot portion is displaced from a center line of the sphere a substantially smaller distance than is the axis of rotation of the threaded locking lever.

In addition to the first mechanical advantage afforded by the threads, the noted difference in displacements, preferably 5:1, produces a pivotable mechanical advantage. As a result, a substantial locking torque can be generated relative to the ball.

A Belleville washer, or other spring biasing element, can be inserted into the housing between the other plate and the housing so as to provide the preload. Additionally, when the locking lever is moved into its adjustment position, the presence of the preload, while permitting both tilting and rotation relative to the ball, still applies a restraining force via the plate adjacent to the ball.

The structure is able to support loads that can generate on the order of 200 foot pounds of torque in a locked state and 20 foot pounds in an unlocked state due to the pre-load. Adjustment can be achieved over a tilt range on the order of 30° and a rotation range on the order of 360°.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 3 is a sectional view illustrating an alternate to the clamp of FIG. 2.

DETAILED DESCRIPTION OF THE PREFERRED EMBODIMENTS

Figure 1:
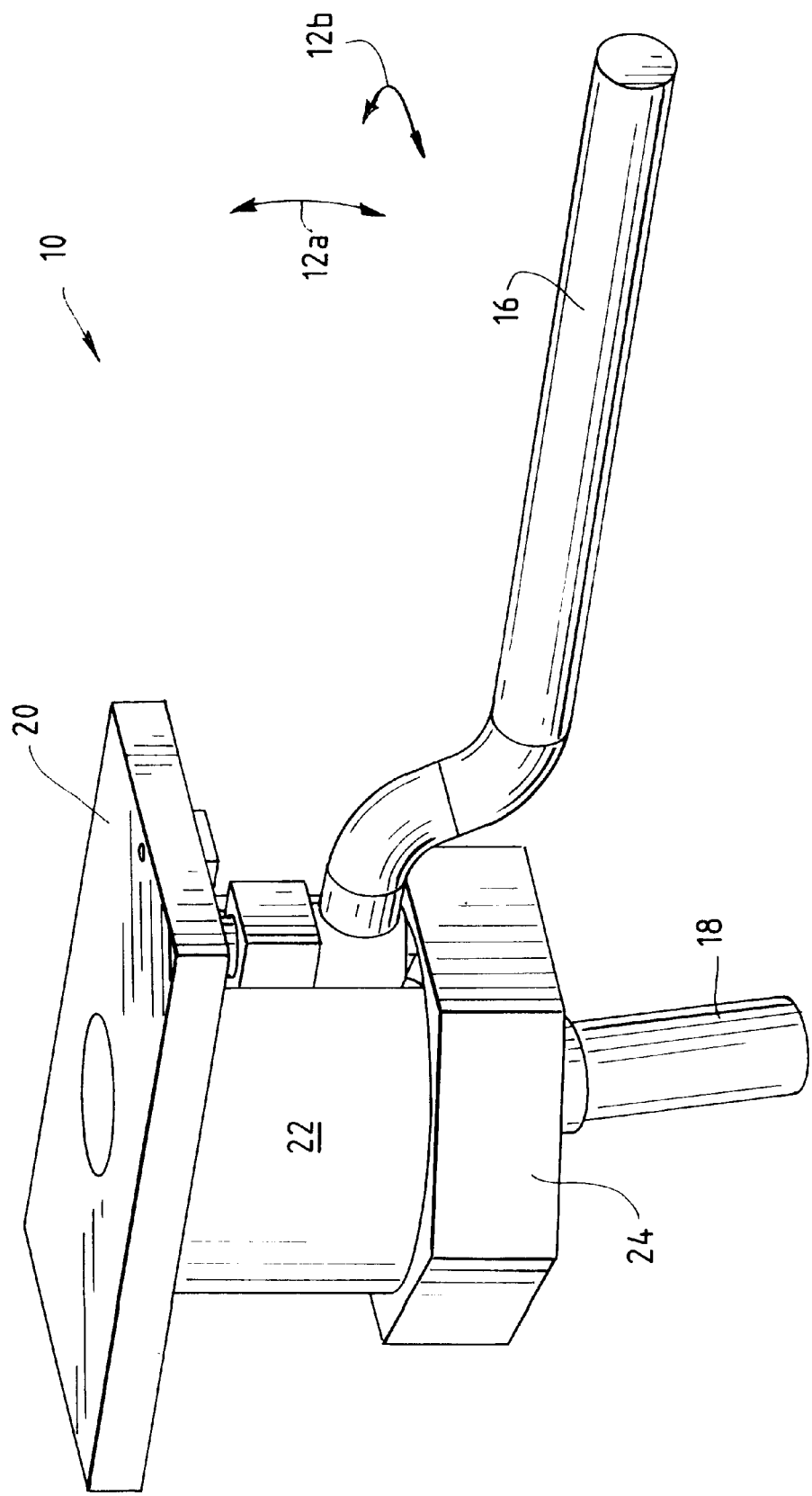
FIG. 1 is a perspective view of a clamp in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates a perspective view of a system 10 for mounting a display unit D for multi-dimensional movement generally in directions 12a and 12b. Tilting movement in the direction 12a can be on the order of 30°. Rotational movement, indicated by direction 12b, can be in a range on the order of 360°.

System 10 includes a locking lever 16 which provides one-handed operation for tilting, rotating and locking the supported display with a particular orientation in the movement range of the system 10. System 10 is attached to a mounting surface by a mounting shaft 18. The display D is carried on a mounting bracket or support plate 20. The mounting bracket or support plate 20 can be configured so as to be compatible with the selected display.

The system 10 includes a housing 22 to which is a preload nut 24, discussed subsequently, rotatably coupled.

Figure 2:
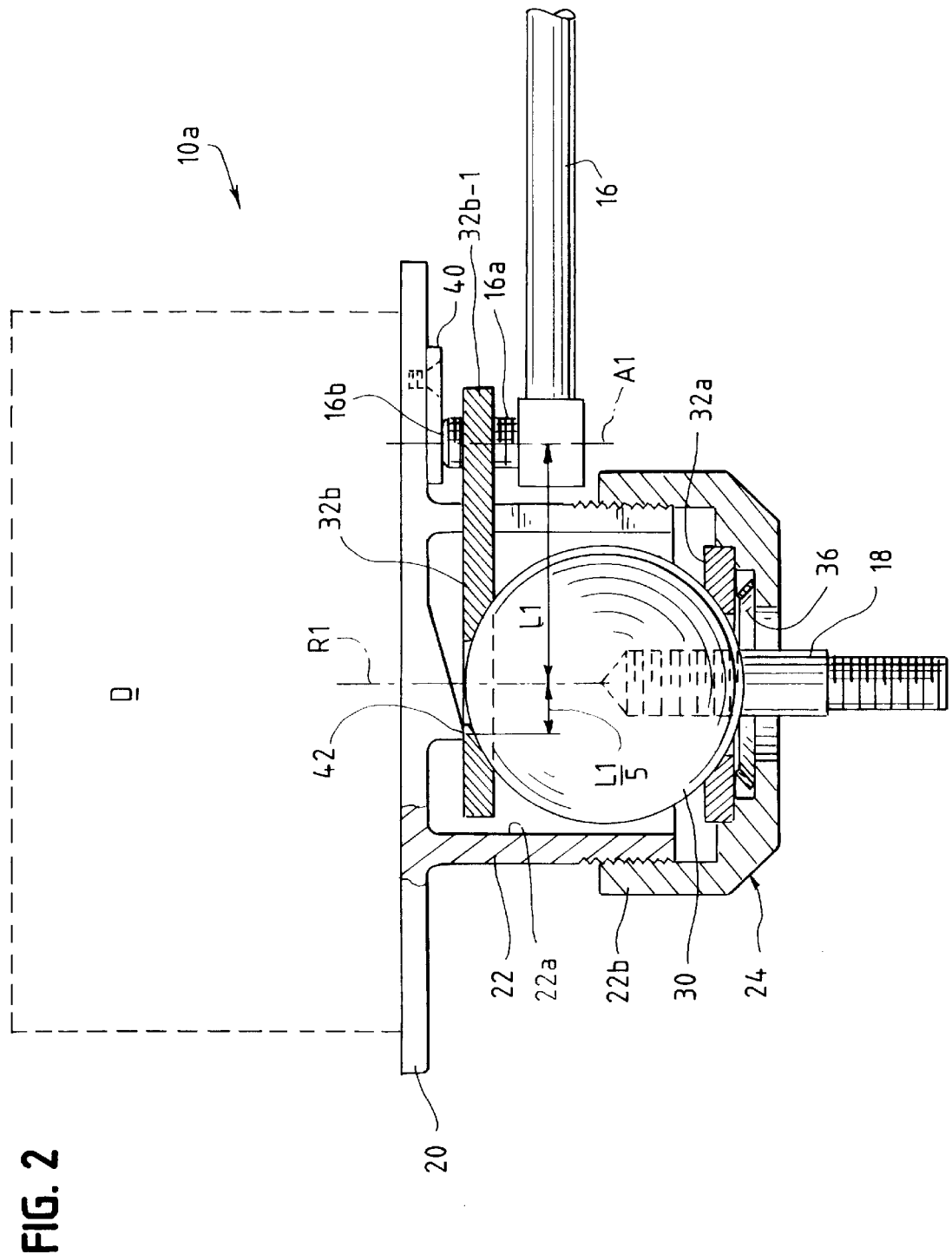
FIG. 2 is a sectional view illustrating the structure of the clamp of FIG. 1.

FIG. 2 illustrates details of a particular embodiment of a system 10a. Where the system 10a includes elements the same as those previously discussed with respect to system 10 of FIG. 1 the same identification numerals have been used.

The system 10a includes a stainless steel sphere or ball 30 which is fixedly attached to mounting shaft 18. Housing 22 as well as nut 24 and mounting plate or bracket 20 rotate in the direction 12b about the ball 30 and tilt in the direction 12a with respect to the ball 30.

The ball 30 is sandwiched in an interior region 22a of housing 22 between first and second wear plates 32a and 32b. The plates 32a, 32b can be formed of a selected steel which resists wear as used herein. While a variety of types of steel are usable, preferably steel sold under the trademark NITRONIC STEEL would be used for wear plates 32a, 32b.

Nut 24 which rotatably engages housing 22 via threads 22b establishes a preload force, for example on the order of 20 foot-pounds, to stabilize display D in the event that locking lever 16 is moved to an unlocked position. The preload force is established via a spring element 36 which could be implemented, for example, as a Belleville washer.

As the nut 24 is screwed onto the housing 22, a preload force is established by the action of spring 36 which clamps wear plate 32a against sphere 30, and wear plate 32b. Depending on the degree of rotation of nut 24, the preload force can be set to various values.

Locking lever 16 carries a threaded stud 16a which rotates about axis A1 in a threaded boring in wear plate 32a adjacent end 32b-1. An end 16b of stud 16a rotatably bears against striker plate 40 which has been attached to mounting bracket or element 20. As discussed in more detail subsequently, rotating locking lever 16 such that end 16b is retracted from striker plate 40 results in system 10a being tiltable and rotatable in directions 12a, 12b subject to overcoming the preload force.

Substantial and unexpectedly large clamping forces on the order of 10,000 pounds can be produced using system 10a. This results in a high degree of security in maintaining display D at the desired orientation even in the presence exterior disturbing forces of a type that might be generated by vehicles moving over rough terrain or the like. While the clamping force is large, the orientation of the display D can readily be changed with one handed operation using locking lever 16.

The very desirable and advantageous mode of operation of the system 10a is due to the multiplicative effects of linking two devices each of which exhibits a mechanical advantage. A first mechanical advantage is achieved through the rotation of locking lever 16 in the threaded boring in the wear plate 32b. This movement of threaded stud 16a in a threaded boring in end region 32b-1 results in a mechanical advantage on the order of 100:1.

The noted mechanical advantage can be regarded as having a travel difference aspect or component and a force difference aspect. For example, if lever 16 extends five inches from the axis of rotation A1, then one rotation thereof corresponds to a travel of about 15.7 inches. At the same time, stud 16a will move axially one thread. At 18 threads/inch, this corresponds to an axial displacement of about 0.055 inches. This is a ratio of 15.7/0.055 or about 280:1.

A force difference on the order of 100:1 is achieved due to the rotation of threaded stud 16a by lever 16 given the difference in the length of lever 16 and radius of stud 16a. Different force differences result from different lever lengths and radii. Due to frictional forces, it appears that the over-all first mechanical advantage is on the order of 100:1.

A second type of mechanical advantage, achieved by the location of pivot point 40 relative to sphere 30 and axis A1, contributes to the formation of the large locking forces. The second type of mechanical advantage results from the fact that pivot 40 on housing 22 is displaced from axis A1. In this regard, a distance L1 between axes A1 and radius R1 of sphere 30 is on the order of five times as large as a distance between radius R1 and pivot 40. This difference in distances results in substantial additional locking forces being produced in the system 10a as a result of locking lever 16 threadably moving end 32b-1 toward wear plate 32a thereby making use of the mechanical advantage produced by the difference in distances L1 and L1/5 as illustrated in FIG. 2.

The combined effect of the two different types of mechanical advantage, on the order of 500:1, results in very high clamping forces on the order of 10,000 pounds. Nevertheless, due to the multiplying effect of two types of mechanical advantage, these forces are readily released with one handed operation using locking lever 16 for purposes of adjusting the orientation of the display D.

FIG. 3 illustrates a variation 10b of the system 10a. Common elements have been assigned identical identification numerals.

In the system 10b, a display mounting bracket 20' can support a display D in various orientations as discussed above. The wear plates 32a' and 32b' of the system of 10b have a slightly different shape than those of the system 10a. However, between the mechanical thread advantage due to threaded stud 16a' rotating in threaded bore in the wear plate 32b' and the mechanical pivot advantage due to the difference in the distances L1 and L1/5 discussed previously, the same type of unexpectedly large clamping forces can be generated in system 10b as were described relative to system 10a. Unlike the system of 10a, in the system of 10b, pivot 40' is carried on wear plate 32b'.

It will be understood that while a ratio of 5:1 has been disclosed relative to the distance between axis A1 and radius R1 and between radius R1 and an associated pivot, it will be understood that other ratios can be used without departing from the spirit and scope of the present invention. For example, a ratio in a range of 4:1 and 6:1 would produce similar results.

While the above description and the figures illustrate rotary coupling between a manually operable locking/ unlocking lever and the coupling mechanism hereof, it will be understood by those of skill in the art that other mechanisms that provide a mechanical advantage for generating a greater output force than an input or control force could be used without departing from the spirit and scope of the present invention. For example, various combinations of levers and pivot points could be used to create such a force generating mechanism. The output force of such a mechanism could then be applied to an end of the respective wear plate.

It will also be understood by those of skill in the art that while a sphere or ball has been illustrated as one of the locking elements in combination with planar wear plates that more generalized spheroidal shapes or ellipsoids could be used without departing from the spirit and scope of the present invention either alone or in combination with planar or non-planar clamps.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. An adjustable mechanical mount comprising:
   a housing having first and second ends and defining an interior region therebetween;
   a locking ball carried within the region;
   an adjustable planar locking plate carried by the housing and extending into the region wherein the plate is in contact with a pivot portion located on one of the housing and the plate and wherein an end of the plate is linearly movable without rotation toward the ball, to thereupon clamp the housing relative to the ball.

2. A mount as in claim 1 wherein the housing defines an opening and a mounting shaft, attached to the ball, extends through the opening.

3. An adjustable mechanical mount comprising:
   a housing having first and second ends and defining an interior region therebetween;
   a locking ball carried within the region wherein the ball has a selected radius;
   an adjustable planar locking plate carried by the housing and extending into the region wherein the plate is in contact with a pivot portion located on one of the housing and the plate and wherein an end of the plate is movable substantially axially toward the ball, to thereupon clamp the housing relative to the ball; and
   wherein a locking lever is rotatably attached to the end of the plate, wherein the lever rotates about an axis that is not coextensive with the radius and wherein the lever, when in a first state, forces the plate into contact with at least a portion of the ball and the pivot portion simultaneously thereby locking the housing relative to the ball and wherein the lever when in a second position, displaced from the first position, releases the plate relative to the ball thereby permitting the housing to move relative to the ball.

4. A mount as in claim 3 wherein the end of the plate extends from the housing.

5. A mount as in claim 3 which incorporates a first mechanical advantage achieved by rotating the locking lever.

6. A mount as in claim 5 which includes a second mechanical advantage achieved by applying a locking force, generated by rotating the locking lever, across a first distance to the ball wherein the first distance is greater than a second distance from the ball to the pivot portion.

7. A mount as in claim 6 wherein the first and second distances are measured relative to a selected radius of the ball.

8. A mount as in claim 7 wherein the first distance exceeds the second distance by an amount in a range of 3 to 6 times the second distance.

9. An adjustable mechanical mount comprising:
   a housing having first and second ends and defining an interior region therebetween;
   a locking ball carried within the region;
   an adjustable planar locking plate carried by the housing and extending into the region wherein the plate is in contact with a pivot portion located on one of the housing and the plate and wherein an end of the plate is movable substantially axially toward the ball, to thereupon clamp the housing relative to the ball; and
   wherein the housing is formed of first and second elements which are rotatably coupled to one another.

10. A mount as in claim 9 wherein the elements of the housing carry mating threads for rotatable engagement.

11. A mount as in claim 9 which includes a preload generating element.

12. A mount as in claim 11 wherein the preload generating element comprises a spring.

13. An adjustable mechanical mount comprising:
   a housing having first and second ends and defining an interior region therebetween;
   a locking ball carried within the region;
   an adjustable planar locking plate carried by the housing and extending into the region wherein the plate is in contact with a pivot portion located on one of the housing and the plate and wherein an end of the plate is movable substantially axially toward the ball, to thereupon clamp the housing relative to the ball; and
   wherein the housing carries a second plate displaced from the first plate axially within the housing, with the ball positioned therebetween.

14. A mount as in claim 13 which includes a preload generating biasing element positioned between a portion of the housing and one of the plates.

15. An adjustable mount comprising:
   a housing which defines an interior region;
   a sphere carried in the region;
   at least one locking element with an interior section carried in part in the region and an exterior section which extends, in part, from the housing wherein the element is in contact, within the housing with at least a portion of the sphere and a pivot wherein when the exterior section is pivoted relative to the pivot and forced toward the sphere, the housing is clamped thereto and is not movable and wherein when the exterior section is not forced toward the sphere, the housing is movable relative thereto; and
   a spring to preload the sphere.

16. A mount as in claim 15 wherein the pivot is carried on one of the housing and the locking element.

17. An adjustable mount comprising:
   a housing which defines an interior region;
   a sphere carried in the region;
   at least one locking element with an interior section carried in part in the region and an exterior section which extends, in part, from the housing wherein the element is in contact, within the housing with at least a portion of the sphere and a pivot wherein when the exterior section is pivoted relative to the pivot and forced toward the sphere, the housing is clamped thereto and is not movable and wherein when the exterior section is not forced toward the sphere, the housing is movable relative thereto; and wherein the housing has first and second parts, coupled together.

18. A mount as in claim 17 wherein the parts of the housing are rotatably coupled together.

19. An adjustable mount comprising:

a housing which defines an interior region;

a sphere carried in the region;

at least one locking element with an interior section carried in part in the region and an exterior section which extends, in part, from the housing wherein the element is in contact, within the housing with at least a portion of the sphere and a pivot wherein when the exterior section is pivoted relative to the pivot and forced toward the sphere, the housing is clamped thereto and is not movable and wherein when the exterior section is not forced toward the sphere, the housing is movable relative thereto; and which includes a second locking element, displaced from the one locking element, carried by the housing in the region with the sphere positioned therebetween.

20. A mount as in claim 19 wherein at least one of the locking elements is planar.

21. An adjustable mount comprising:

a housing which defines an interior region;

a sphere carried in the region;

at least one locking element with an interior section carried in part in the region and an exterior section which extends, in part, from the housing wherein the element is in contact, within the housing with at least a portion of the sphere and a pivot wherein when the exterior section is pivoted relative to the pivot and forced toward the sphere, the housing is clamped thereto and is not movable and wherein when the exterior section is not forced toward the sphere, the housing is movable relative thereto;

which includes a locking lever that rotatably engages the exterior section of the locking element in a locking position so as to force the exterior section toward the sphere thereby locking the sphere relative to the housing; and wherein the locking level rotates about a first axis, via threads, thereby creating a rotary-type mechanical advantage.

22. A mount as in claim 21 wherein the locking lever is movable from the locking position to another position whereupon the housing can be tilted or rotated relative to the sphere.

23. A mount as in claim 21 wherein the first axis is displaced a first distance from a radius of the sphere and wherein the pivot is displaced a second, shorter distance from the radius thereby resulting in a second different type of mechanical advantage.

24. A mount as in claim 23 wherein the first distance exceeds the second distance by at least a factor of 3.

25. An adjustable mount comprising:

a housing which defines an interior region;

a sphere carried in the region;

at least one locking element with an interior section carried in part in the region and an exterior section which extends, in part, from the housing wherein the element is in contact, within the housing with at least a portion of the sphere and a pivot wherein when the exterior section is pivoted relative to the pivot and forced toward the sphere, the housing is clamped thereto and is not movable and wherein when the exterior section is not forced toward the sphere, the housing is movable relative thereto;

which includes a locking lever that rotatably engages the exterior section of the locking element in a locking position so as to force the exterior section toward the sphere thereby locking the sphere relative to the housing;

wherein the locking lever is movable from the locking position to another position whereupon the housing can be tilted or rotated relative to the sphere; and wherein when the locking lever is in the another position, the housing can be tilted through an angle in excess of 25° and rotated through an angle in excess of 80°.

26. A mount as in claim 25 which includes a biasing element for preloading the sphere, when the lever is in the another position, to inhibit movement of the housing, relative to the sphere, in the presence of torques of less than a preset value.

27. A mount as in claim 26 wherein the preset value comprises about 20 foot-pounds.

28. A mount as in claim 25 wherein when the locking lever is in the locking position, the sphere will not move relative to the housing, in the presence of applied torque up to 200 foot-pounds.

29. An adjustable mount comprising:

a housing which defines an interior region;

a sphere carried in the region;

at least one locking element with an interior section carried in part in the region and an exterior section which extends, in part, from the housing wherein the element is in contact, within the housing with at least a portion of the sphere and a pivot wherein when the exterior section is pivoted relative to the pivot and forced toward the sphere, the housing is clamped thereto and is not movable and wherein when the exterior section is not forced toward the sphere, the housing is movable relative thereto;

which includes a locking lever that rotatably engages the exterior section of the locking element in a locking position so as to force the exterior section toward the sphere thereby locking the sphere relative to the housing; and wherein a portion of the locking lever rotatably engages a portion of the housing.

30. An adjustable mount comprising:

a housing which defines an interior region;

a sphere carried in the region;

at least one locking element with an interior section carried in part in the region and an exterior section which extends, in part, from the housing wherein the element is in contact, within the housing with at least a portion of the sphere and a pivot wherein when the exterior section is pivoted relative to the pivot and forced toward the sphere, the housing is clamped thereto and is not movable and wherein when the exterior section is not forced toward the sphere, the housing is movable relative thereto; and which includes a mounting shaft coupled to the sphere.

31. An adjustable mount comprising:

a housing which defines an interior region;

a sphere carried in the region;

at least one locking element with an interior section carried in part in the region and an exterior section which extends, in part, from the housing wherein the element is in contact, within the housing with at least a portion of the sphere and a pivot wherein when the exterior section is pivoted relative to the pivot and forced toward the sphere, the housing is clamped thereto and is not movable and wherein when the exterior section is not forced toward the sphere, the housing is movable relative thereto; and wherein the sphere has a selected radius, wherein the pivot is displaced from the radius a first distance and wherein a locking force is applied to the exterior section, forcing same toward the sphere, at a second distance from the radius which exceeds the first distance.

32. A mount as in clam 31 wherein the locking force is generated by a lever rotatably coupled to the exterior section at the second distance.

33. A mount as in claim 31 wherein the second distance exceeds the first distance by at least a factor of three.

34. A mount as in claim 33 wherein the second distance exceeds the first distance by an amount on the order of 5:1.

35. A method of clamping a first element relative to a second element comprising:

defining a pivot region displaced from a selected part of the second element a predetermined distance;

defining a force applying region on the first element; and positioning the first element adjacent to the pivot region and adjacent to the second element with the force applying region displaced from the selected part of the second element a distance which exceeds the predetermined distance.

36. A method as in claim 35 wherein the predetermined distance is measured relative to a central line of the second element.

37. A method as in claim 35 which includes applying a clamping force at the force applying region so as to clamp the elements relative to one another thereby opposing relative motion therebetween.

38. A method as in claim 37 which includes generating the clamping force by applying a torque relative to a selected axis of the force applying region.

39. A method as in claim 37 which includes providing a pre-load, movement restraining force to the elements.

40. A method as in claim 37 which includes rotating a force generator and directing a first force generated thereby to the force applying region.

41. A method as in claim 40 which includes using a lesser, second, force to rotate the generator to produce the first force.

42. A method as in claim 41 which includes generating a greater clamping force than the first force in response to applying the second force.

43. An apparatus comprising:

a generally spheroidal element;

a fulcrum;

a clamp that engages a peripheral surface of the element wherein the clamp is arranged to bear against a portion of the surface at a first distance from the fulcrum thereby to produce a clamping force;

a force generator having an activating lever and an output force generated in response to activating the lever with a control force; and a coupler for transmitting the output force to the clamp at a location displaced from the fulcrum by a second distance, greater than the first distance.

44. An apparatus as in claim 43 wherein the activating lever produces the output force with a first mechanical advantage.

45. An apparatus as in claim 44 wherein the clamping force is generated with a second mechanical advantage.

46. An apparatus as in claim 45 wherein the combined first and second mechanical advantages exceed 400:1.

47. An apparatus as in claim 43 comprising;

a housing that defines an internal region wherein the element is positioned in the region.

48. An apparatus as in claim 47 wherein the clamp extends in part from the housing.

49. An apparatus as in claim 47 wherein the fulcrum is carried by one of the housing and the clamp.

50. An apparatus as in claim 47 wherein the clamp is substantially planar.

51. An apparatus as in claim 43 wherein the force generator comprises a threaded stud attached to a manually operable activating lever.

52. An apparatus as in claim 51 wherein the stud rotates about an axis that is at the second distance from the fulcrum.

53. An apparatus as in claim 51 wherein the activating lever in combination with the threaded stud produces a first mechanical advantage having a travel difference component and a force difference component.

54. An apparatus as in claim 53 wherein the force difference component exceeds 80:1.

55. An apparatus as in claim 53 wherein the first mechanical advantage exceeds 80:1.

56. An apparatus as in claim 55 wherein the first mechanical advantage is on the order of 100:1.

57. An apparatus as in claim 53 wherein the travel difference component exceeds 200:1.

* * * * *